US011176206B2

(12) United States Patent
Adir et al.

(10) Patent No.: US 11,176,206 B2
(45) Date of Patent: Nov. 16, 2021

(54) INCREMENTAL GENERATION OF MODELS WITH DYNAMIC CLUSTERING

(71) Applicant: International Business Machines Corporation, Armonk, NY (US)

(72) Inventors: Allon Adir, Kiryat Tivon (IL); Ehud Aharoni, Kfar Saba (IL); Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 14/955,361

(22) Filed: Dec. 1, 2015

(65) Prior Publication Data

US 2017/0154280 A1     Jun. 1, 2017

(51) Int. Cl.
*G06N 20/00* (2019.01)
*G06N 5/04* (2006.01)
*G06F 16/906* (2019.01)
*G06F 16/28* (2019.01)

(52) U.S. Cl.
CPC .......... *G06F 16/906* (2019.01); *G06F 16/285* (2019.01); *G06N 5/045* (2013.01); *G06N 20/00* (2019.01)

(58) Field of Classification Search
CPC .................................................. G06K 9/6219
See application file for complete search history.

(56) References Cited

U.S. PATENT DOCUMENTS

| | | | |
|---|---|---|---|
| 5,448,727 A | 9/1995 | Annevelink | |
| 6,012,058 A * | 1/2000 | Fayyad | G06F 17/30705 |
| 6,397,166 B1 * | 5/2002 | Leung | G06F 17/18 |
| | | | 702/179 |
| 6,907,436 B2 | 6/2005 | Ye et al. | |
| 7,779,349 B2 | 8/2010 | Spangler | |
| 7,873,643 B2 | 1/2011 | Hadzikadic et al. | |
| 7,937,269 B2 * | 5/2011 | Aggarwal | G10L 15/063 |
| | | | 704/231 |
| 8,326,777 B2 | 12/2012 | Zhang et al. | |
| 8,489,632 B1 * | 7/2013 | Breckenridge | G06K 9/6288 |
| | | | 707/778 |
| 8,832,105 B2 | 9/2014 | Punera et al. | |

(Continued)

FOREIGN PATENT DOCUMENTS

EP    1191463 B1    4/2010

OTHER PUBLICATIONS

Trivedi et al., Clustering Students to Generate an Ensemble to Improve Standard Test Score Predictions, In. Proc. of the 15th Int'l Conference on AI in Education (2011) at 1-8 (Year: 2011).*

(Continued)

*Primary Examiner* — Michael J Huntley
*Assistant Examiner* — Fen Christopher Tamulonis
(74) *Attorney, Agent, or Firm* — Anthony R. Curro (57) ABSTRACT

Incremental generation of models with dynamic clustering. A first set of data is received. A first set of clusters based on the first set of data is generated. A respective first set of models for the first set of clusters is created. A second set of data is received. A second set of clusters, based on the second set of data and based on a subset of the first set of data, is generated. A respective second set of models for the second set of clusters, based on a subset of the first set of models and based on the second set of data, is created.

15 Claims, 3 Drawing Sheets

(56) References Cited

U.S. PATENT DOCUMENTS

2006/0047655 A1  3/2006  Peter
2014/0058723 A1  2/2014  Shen et al.

OTHER PUBLICATIONS

Domeniconi & Gunopulos, Incremental Support Vector Machine Construction, In Proc. IEEE Int'l Conference on Data Mining (2001) at 589-592 (Year: 2001).*

Katakis et al., Tracking Recurring Contexts using Ensemble Classifiers: An Application to Email Filtering, Knowl Inf Syst (2010) 22 at pp. 371-391, retrieved from Internet <https://link.springer.com/content/pdf/10.1007%2Fs10115-009-0206-2.pdf> (Year: 2010).*

Langone et al., Incremental Kernel Spectral Clustering for Online Learning of Non-Stationary Data, Neurocomputing 139 (2014) at pp. 246-260. (Year: 2014).*

Trivedi et al., Clustering Students to Generate an Ensemble to Improve Standard Test Score Predictions, In. Proc. of the 15th Int'l Conference on AI in Education (2011) (Year: 2011).*

Crabtree & Soltysiak, Identifying and Tracking Changing Interests, Int. J. Digit Libr. vol. 2 at pp. 38-53 (1998) (Year: 1998).*

Domeniconi & Gunopulos, Incremental Support Vector Machine Construction, In Proc. IEEE Int'l Conference on Data Mining (2001) (Year: 2001).*

Bahri et al. "A multiple Classifier system using an adaptive strategy for intrusion detection" ICICS '2012 [Published 2012] [Retrieved 2019] <URL: https://pdfs.semanticscholar.org/867e/d50e132ca9b9d9476b04d753b8965825f796.pdf> (Year: 2012).*

Christou, Ioannis T. et al. "A classifier ensemble approach to the TV-viewer profile adaptation problem" Int. J. Mach. Learn. (2012) [Retrieved Jul. 2021] <URL: https://link.springer.com/content/pdf/10.1007/s13042-011-0066-4.pdf> (Year: 2012).*

K. Y. Chan, T. S. Dillon, J. Singh and E. Chang, "Neural-Network-Based Models for Short-Term Traffic Flow Forecasting Using a Hybrid Exponential Smoothing and Levenberg-Marquardt Algorithm," in IEEE Transactions ITS, vol. 13, No. 2, pp. 644-654, Jun. 2012, doi: 10.1109/TITS.2011.2174051. (Year: 2011).*

K. Nishida and K. Yamauchi, "Learning, detecting, understanding, and predicting concept changes," 2009 International Joint Conference on Neural Networks, 2009, pp. 2280-2287, doi: 10.1109/IJCNN.2009.5178619. (Year: 2009).*

Choubey et al., "Enhanced Clustering Algorithm for Processing Online Data", IOSR Journal of Computer Engineering, ISSN: 2278-8727, vol. 12, Issue 5 (Jul.-Aug. 2013) pp. 24-29.

Aaron et al., "Dynamic Incremental K-means Clustering", 2014 International Conference on Computational Science and Computational Intelligence, 2014 IEEE, 6 pages.

Burbeck et al.," Adaptive Real-Time Anomaly Detection with Incremental Clustering", Science Direct, 2007, pp. 56-67.

Chung et al., "Dynamic Pattern Mining: An Incremental Data Clustering Approach", Journal on Data Semantics II, LNCS 3360, 2004, pp. 85-112.

Pope et al., "Learning Object Recognition Models From Images", To appear in Early Visual Learning, edited by Tomaso Poggio and Shree Nayer, Jan. 1995, 32 pages.

* cited by examiner

INCREMENTAL GENERATION OF MODELS WITH DYNAMIC CLUSTERING

BACKGROUND

The present invention relates generally to the field of classifying data, and more particularly to incrementally generating models with dynamic clustering of the modeled data.

In some data analysis cases, data is continuously gathered for a set of objects. Based on this data, the objects are clustered and a model is generated for each cluster, which captures its behavior. The models may then be used for tasks such as behavior prediction, anomaly detection, etc. For example, when tracking access patterns of users of a database, query data may be collected for each user, the users are then clustered, based on their query histories, and a model describing the behavior of each cluster is generated. These models may then be used to detect anomalous database activity.

Models for clusters may need to be updated when additional data becomes available. The updating typically takes into account both the old data, which has accumulated since the last model creation, and the new data that has arrived since then. However, this can be time consuming, since the amount of old data steadily increases as additional data arrives. In some cases, the old data may be too voluminous to maintain, even for relatively short periods of time.

One way to alleviate this performance problem is to update the models by considering only the new data and the existing, or old, models, which are based on the old data, rather than reprocessing the old data along with the new data. This approach is often referred to as incremental training or incremental learning. For example, recency-weighted models that combine the old models and the new data while giving a higher weight to the new data, thus reducing the effects of the oldest data and increasing the relative effect of the more recent data, could be used.

New data that arrives may affect not only the models of the clusters but also the clusters themselves. Known methods exist for performing incremental clustering. Such methods recompute the clusters, without analyzing the entire set of old data, by using the existing clusters along with the new data. The challenge is to perform incremental training of the models when the clusters to which the models belong are also under continuous change. Incremental training calls for updating the existing models based on the new data, but the existing models are based on the old clusters, whereas now updated models for the new clusters need to be computed.

SUMMARY

Embodiments of the present invention disclose a computer-implemented method, computer program product, and system for incremental generation of models with dynamic clustering. A first set of data is received. A first set of clusters based on the first set of data is generated. A respective first set of models for the first set of clusters is created. A second set of data is received. A second set of clusters, based on the second set of data and based on a subset of the first set of data, is generated. A respective second set of models for the second set of clusters, based on a subset of the first set of models and based on the second set of data, is created.

DETAILED DESCRIPTION

Embodiments of the present invention disclose a computer-implemented method, computer program product, and system for incremental training of models with dynamic clustering. An initial set of objects is clustered, based on data associated with the objects, and for each cluster a model is generated. As new data is received, the objects are reclustered, based on the new data and the old data. Rather than computing models for the new clusters directly from the old data, for each new cluster the proportion of each of the old clusters contained in the new cluster is determined. The model for each new cluster is a weighted average of the models for the old clusters, according to these proportions. For each new cluster, the resulting model is then modified by analyzing only the new data that was received.

In an exemplary embodiment of the invention, clustering refers to partitioning objects, or data points, into disjoint sets, so that each data point belongs to exactly one cluster. In other embodiments, clustering may be fuzzy, i.e., a data point may belong to one or more clusters and associated with each of the points are membership degrees that indicate the degree to which the data points belong to the different clusters.

According to various embodiments of the present invention, for updating the cluster models it is only necessary to analyze the new data; a further analysis of the old data is unnecessary. As the old dataset is generally much larger than the new dataset, because it originates from the entire history of data, while the new data only originates from recent events, this may result in a significant performance improvement. Moreover, in many cases the old data may no longer be available for repeated analysis. This may occur, for example, in online training, where the amount of old data is too voluminous to retain. In such cases, the present invention may still enable the maintenance of models of the clustered objects. To support updating the clusters, either the entire set of old data may be kept, or only the subset of it required by the clustering algorithm, or, in case of incremental clustering, none of the old data may need to be kept.

Machine learning is a field of computer science and statistics that involves the construction of algorithms that learn from and make predictions about data. Rather than following explicitly programmed instructions, machine learning methods operate by building a model using selected, known inputs, and using the model to make predictions or decisions about unknown inputs. Classification is a machine learning task concerned with the problem of identifying to which of a set of categories, or classes, an input belongs. Common applications of classification include spam filtering and anomaly detection.

In supervised machine learning, a model is represented by a classification function, which may be inferred, or trained, from a set of labeled training data. The training data consists of training examples, typically pairs of input objects and desired output objects, for example class labels. During training, or learning, parameters of the function are adjusted, usually iteratively, so that inputs are assigned to one or more of the classes to some degree of accuracy, based on a predefined metric. The inferred classification function can then be used to classify new examples. Common classification algorithms include logistic regression, naïve Bayes classification, and support vector machines (SVM).

Unsupervised machine learning refers to a class of problems in which one seeks to determine how data is organized. It is distinguished from supervised learning in that the model being generated is given only unlabeled examples. Clustering is an example of unsupervised learning.

Cluster analysis, or clustering, is the task of grouping a set of objects in such a way that objects in the same group, called a cluster, are more similar in some sense to each other than to those in other groups. Clustering is a common technique in statistical data analysis, and is used in fields such as machine learning, pattern recognition, image analysis, and information retrieval. Methods for clustering vary according to the data being analyzed. A method that is popular in data mining is k-means clustering, in which a dataset is partitioned into a predetermined number, k, of clusters.

Incremental clustering, variously known as online, data stream, or dynamic clustering, refers to methods of clustering data that arrives continuously. Incremental clustering methods update existing clusters as new data arrives. This may include assigning objects for clustering to existing clusters, creating new clusters, and merging or deleting existing clusters. Various methods of incremental clustering, for example, based on k-means, exist.

Anomaly detection is the identification of items, events, or observations that do not conform to an expected pattern or to other items in a dataset. The anomalous items may indicate a problem such as network intrusion, bank fraud, a structural defect, medical problems, or errors in a text.

Various techniques for anomaly detection exist. Unsupervised anomaly detection techniques detect anomalies in unlabeled data under the assumption that the majority of the instances in the data are "normal," by looking for instances that seem to least fit the data as a whole. For example, user group profiles representing characteristic behaviors based on SQL commands, or queries, that users submit to a relational database, may be created. Given such profiles, an anomaly is an access pattern that deviates from the profiles, and may represent malicious behavior. SQL queries stored in log files may be used to generate clusters, or user groups, groups of users that behave similarly. Then a model, or profile, may be created for each cluster based on these log files, which represents normal database access behavior for a user group. Each database user is associated with one of these clusters. For anomaly detection, a classifier may be applied to determine whether a new query by a user conforms to the model or profile of the user's cluster. If it deviates significantly, it may be declared to be an anomaly, representing suspected malicious activity.

Figure 1:
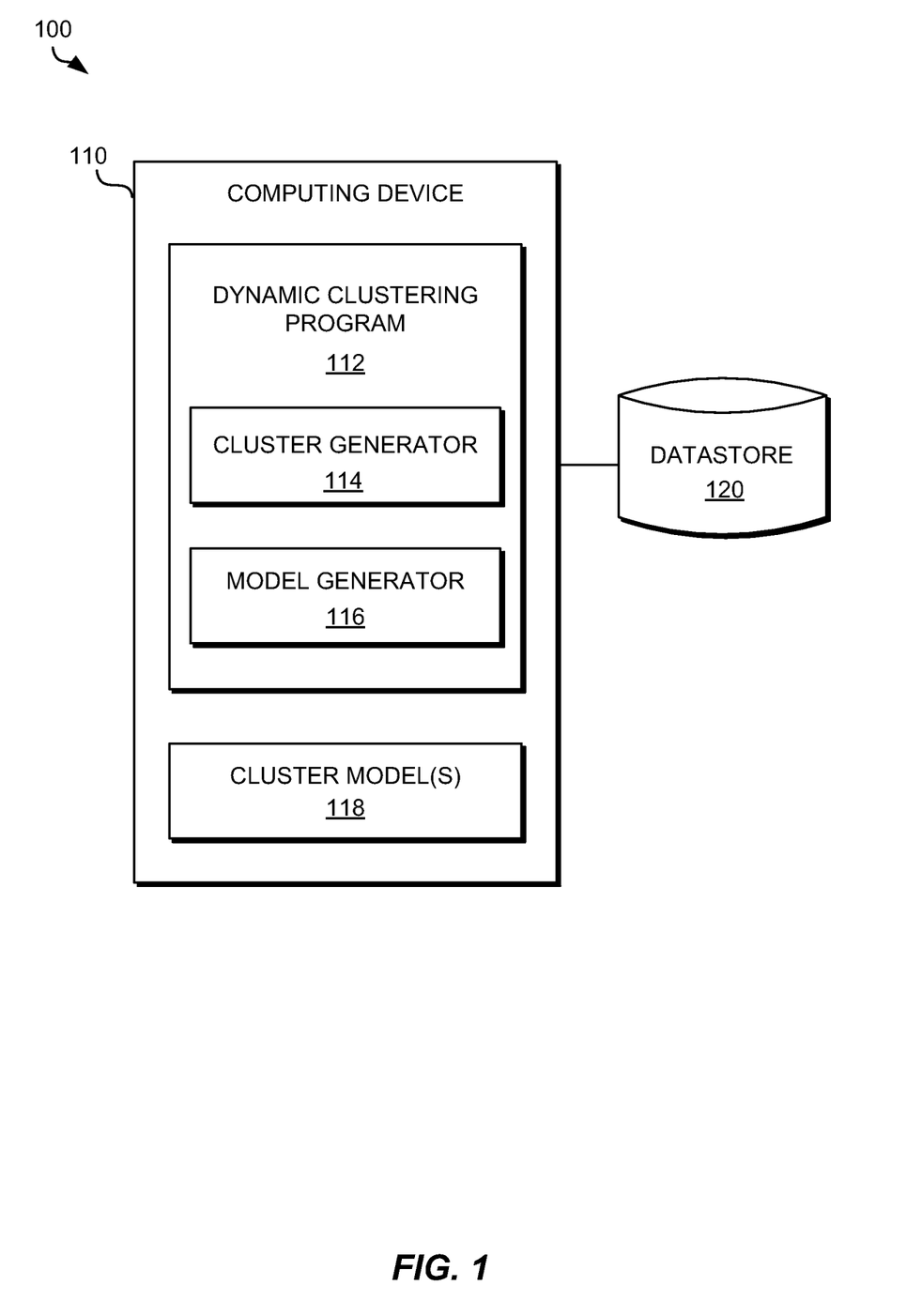
FIG. 1 depicts a functional block diagram of a dynamic clustering system, in accordance with an embodiment of the present invention.

FIG. 1 is a functional block diagram of a dynamic clustering system 100, in accordance with an embodiment of the present invention. Dynamic clustering system 100 includes computing device 110. Computing device 110 represents the computing environment or platform that hosts dynamic clustering program 112. In various embodiments, computing device 110 may be a laptop computer, netbook computer, personal computer (PC), a desktop computer, or any programmable electronic device capable of hosting dynamic clustering program 112, in accordance with embodiments of the invention. Computing device 110 may include internal and external hardware components, as depicted and described in further detail below with reference to FIG. 3.

In an exemplary embodiment of the invention, computing device 110 includes dynamic clustering program 112, cluster models 118, and datastore 120.

Figure 3:
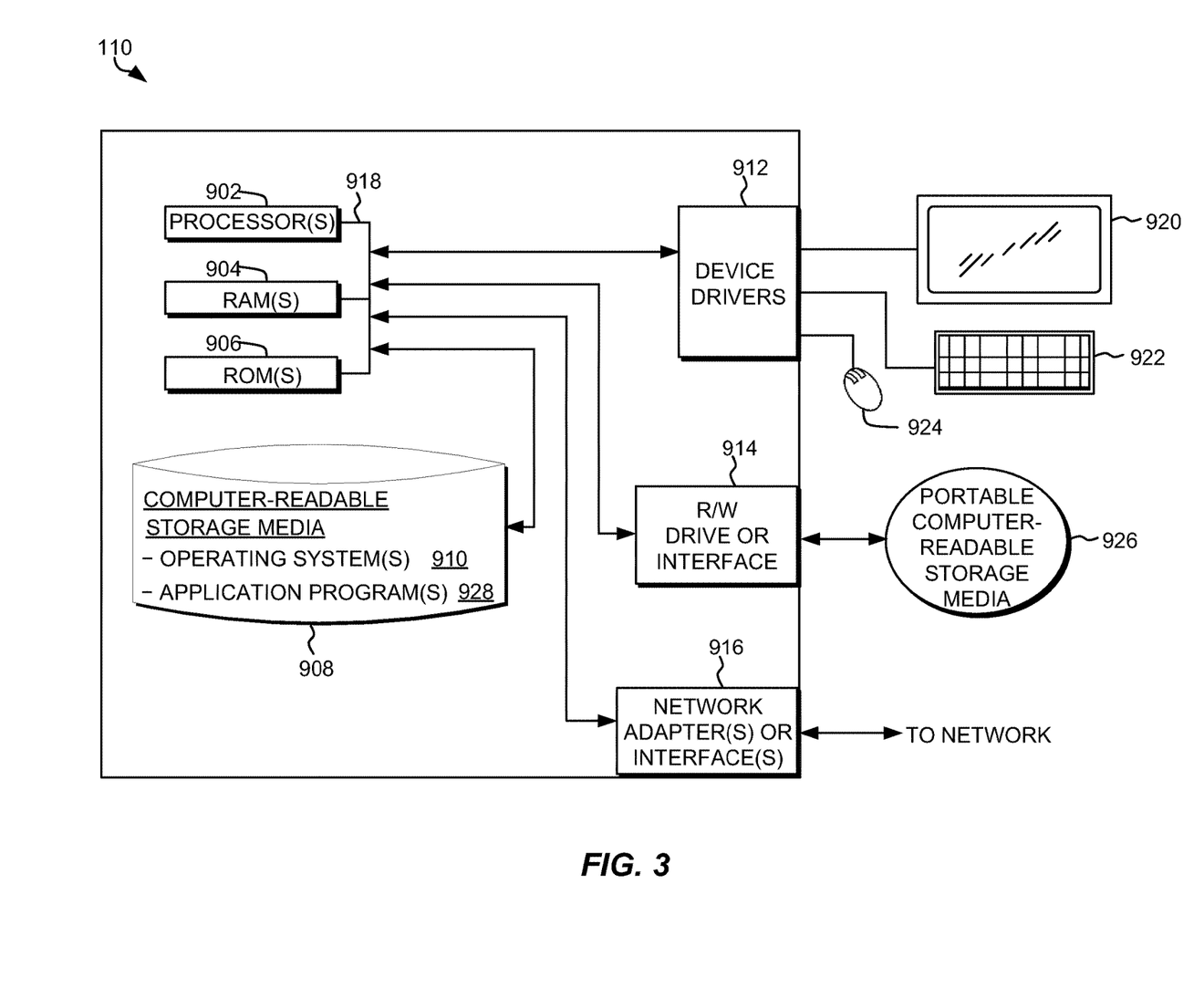
FIG. 3 is a functional block diagram illustrating a data processing environment, in accordance with an embodiment of the present invention.

Datastore 120 represents a store of data that may undergo clustering and model generation, in accordance with an embodiment of the present invention. For example, datastore 120 may include data on user access histories with respect to a database, including user IDs, and types and frequencies of database commands issued by users. Datastore 120 may reside, for example, on computer readable storage media 908 (FIG. 3).

Cluster models 118 represent models, for example, classification machine learning models, that employ a classification algorithm to perform a task such as anomaly detection, behavior prediction, fraud detection, etc., in accordance with an embodiment of the present invention. In one embodiment of the invention, cluster models 118 are machine learning models, trained to apply a classification algorithm, such as multiclass logistic regression or naïve Bayes, to classify data points as normal or anomalous. Cluster models 118 may use, for example, supervised learning with labeled data from datastore 120, consisting of data points paired with labels that identify them as being associated with one class or another, for example, legal transactions or fraudulent transactions. In other embodiments, cluster models 118 may include a list of features or events along with frequencies or probabilities of occurrences of the features or events that are characteristic of their cluster.

In an embodiment of the invention, data continuously arrives from a data source, for example, from datastore 120. A predefined training period is established, so that when each training period elapses, reclustering and incremental training is performed. Between training periods new data may arrive. The new data may be used in performing the machine learning tasks of the system, for example, behavior prediction, or anomaly detection, based on the models that have been generated in the most recent training period.

Dynamic clustering program 112, in an embodiment of the invention, operates generally to receive an initial set of data, perform clustering on the initial data, and create models for the clusters. Dynamic clustering program 112 may receive a new set of data, generate clusters based on the old and new data, and create models for the new clusters, based on the old clusters, old cluster models, and the new data. Dynamic clustering program 112 may include cluster generator 114 and model generator 116.

Cluster generator 114 operates generally to cluster or recluster data, in accordance with an embodiment of the invention. Cluster generator 114 may apply a clustering method to an initial set of data. Cluster generator 114 may also generate clusters based on new data that is received, data previously received (referred to as old data), and/or an existing set of clusters, in accordance with an embodiment of the invention. For example, cluster generator 114 may employ incremental clustering to update existing clusters as new data arrives. Alternatively, cluster generator 114 may merge some or all of the old data with the new data and perform clustering on the merged dataset. For example, cluster generator 114 may periodically recluster all data that has arrived within a predefined time frame, or when the volume of data received reaches a predefined limit. Cluster generator 114 may generate clusters by applying one or more well-known clustering algorithms, for example, a distance-based clustering algorithm such as k-means, a probabilistic, density-based clustering algorithm such as expectation maximization, or a grid-based clustering algorithm such as orthogonal partitioning clustering.

Model generator 116 operates generally to create cluster models 118, in accordance with an embodiment of the present invention. Model generator 116 may create an initial set of cluster models 118 from an initial set of data. When new data is available, for example, at the end of a monitoring or training period of predefined length, and/or after reclustering, model generator 116 may create new cluster models 118, in accordance with an embodiment of the invention, based on the existing cluster models and the new data. For example, after cluster generator 114 has reclustered a set of old data and new data, to generate a set of new clusters, model generator 116 may generate a new cluster model 118 as follows. For each new cluster in the new set of clusters, model generator 116 may identify any old clusters that contain objects that are also contained in the new cluster. These old clusters are referred to as source clusters for the new cluster. Model generator 116 may compute a model for the new cluster, based on the models for the source clusters and on the new data that has arrived since the old clusters were computed, using a weighted combination, with a weight for each source cluster according to the proportion that each source clusters contributes to the new cluster, so that the new model represents a weighted average of the source cluster models. Model generator 116 may then incorporate the new data into the new model, for example, by incremental training using the new data as training data. For example, model generator 116 may update the new model by weighting the effect of the new data such that it has more effect on the new model than the models of the source clusters. For example, a recency-weighted average such as exponential smoothing, may be used, as illustrated below.

The method chosen for weighting source cluster models and new data may depend on the type of information represented in the models. For example, a simple cluster model 118 may include a count of elapsed training periods, during which the model has been trained, and a ratio, representing the percentage of training periods in which a particular event associated with the cluster occurred. A new cluster model 118 may have a count equal to the maximum of the counts for any source cluster models, and a ratio that is a weighted average of the ratios of the source cluster models, according to the proportion that each source clusters contributes to the new cluster. Model generator 116 may increase the count in the new model by 1 for each training period contained in the new data. Model generator 116 may then adjust the ratio in the new model, based on the occurrence of the particular event in the new data.

For example, a cluster model 118 designed to uncover anomalous database activity may represent the database activity of multiple users, partitioned into clusters that represent similar user behavior. Cluster models 118 may include a count, representing the maximum number of days during which users associated with the cluster have been tracked, and, for various database queries associated with users in the cluster, referred to as events, a ratio representing the percentage of days that particular events occurred. As an illustrative example, suppose that user activity is monitored and cluster models 118 are updated every five days. Suppose that, at the end of a particular 5-day monitoring period, the set of existing, or old, clusters includes cluster B and cluster C. Further, suppose that the model for cluster B has a count of 6 and a ratio of 0.2 for a particular event, and the model for cluster C has a count of 8 and a ratio of 0.1 for the same event. Suppose that reclustering produces a new cluster A, for which clusters B and C are the only source clusters. That is, all of the users in cluster A were assigned to either cluster B or cluster C. For example, suppose that the users in cluster A are, proportionally, ⅓ from cluster B and ⅔ from cluster C. Cluster A may also contain new users whose activity is contained in the new data that has arrived in the last five days. A model for cluster A may be generated from the models for clusters B and C, and from the new data as follows. The count in the model for A may be set to the maximum of the counts for models B and C, in this example, 8. The ratio in the model for A may be set to a weighted average of the ratios for the models of B and C, according to the proportions of B and C in A, which in this example would be ⅓*0.2+⅔*0.1=0.13333. Suppose that the new data associated with cluster A, which was received during the latest monitoring period, indicates that the event occurred twice, corresponding to a ratio of ⅖=0.4. The model for A may be updated, or incrementally trained, with the new data by increasing the count from 8 to 8+5=13 and recomputing the new ratio to be (0.13333*8+0.4*5)/(8+5) =0.23588, a weighted average of the previous ratio, 0.13333, and new ratio, 0.4, with weights according to the number of days for the old cluster (8) and for the new data (5). Thus, the new model for A has a count of 13 and a ratio of 0.23588.

In an alternative embodiment, incrementally training a model with the new data may also be performed using an exponential moving average. In the example given above, for example, the ratio in the new model for A may be computed as follows. Labeling the old ratio, 0.13333, as ratio_8, we may incrementally add five new days. We suppose that for three of these days the event did not occur, and 0 is added to the exponential moving average. For the last two days, the event did occur, and 1 is added to the exponential moving average. A parameter alpha is associated with the exponential average, for example, alpha=0.05. The ratios ratio_9 to ratio_13 (the new ratio) are computed via the formulas $$ratio\_9=(1-alpha)*ratio\_8+alpha*0$$

$$ratio\_10=(1-alpha)*ratio\_9+alpha*0$$

$$ratio\_11=(1-alpha)*ratio\_10+alpha*0$$

$$ratio\_12=(1-alpha)*ratio\_11+alpha*1$$

$$ratio\_13=(1-alpha)*ratio\_12+alpha*1$$

The resulting ratio_13 will be the ratio of the new model for cluster A.

The forgoing, non-limiting, examples are merely illustrative examples of incremental training algorithms and methods of performing a weighted average of models, which may be used in embodiments of the present invention. Others are contemplated.

Figure 2:
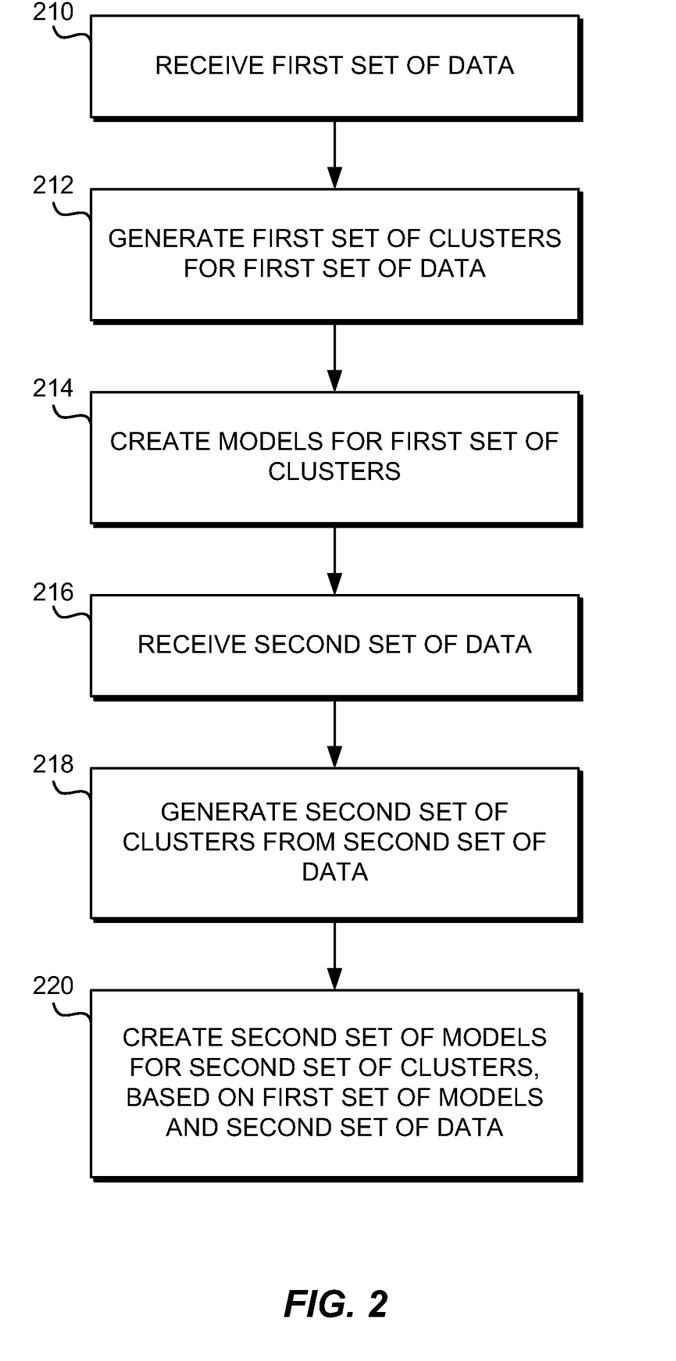
FIG. 2 is a flowchart depicting operational steps of a dynamic clustering program, in accordance with an embodiment of the present invention.

FIG. 2 is a flowchart depicting various operational steps performed by computing device 110 in executing dynamic clustering program 112, in accordance with an exemplary embodiment of the invention. Cluster generator 114 receives a first set of data from datastore 120 (step 210). Cluster generator 114 generates a first set of clusters for the first set of data (step 212). Model generator 116 creates models for the first set of clusters (step 214). Cluster generator 114 receives second set of data (step 216) and generates a second set of clusters from the second set of data (step 218). Model generator 116 creates a second set of models for the second set of clusters, based on the first set of clusters and the second set of data (step 220).

FIG. 3 depicts a block diagram of components of a computing device 110, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, dynamic clustering program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user s. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for incremental training of models with dynamic clustering, the method comprising:
    monitoring a plurality of online database activity associated with a plurality of users for two or more monitoring periods, the database activity including types and frequencies of database queries issued by the users during a monitoring period;
    receiving, by a computer, a first set of data corresponding with database activity during a first monitoring period;
    generating, by the computer, a first set of clusters based on the first set of data, each user during the first monitoring period being associated with one of the first set of clusters;
    creating, by the computer, a respective first set of models of database access behavior for the first set of clusters;
    receiving, by the computer, a second set of data, the second set of data corresponding with database activity during a second monitoring period;
    generating, by the computer, a second set of clusters based on the second set of data and based on a subset of the first set of data, wherein each user during the second monitoring period is associated with one of the second set of clusters; and
    creating, by the computer, a respective second set of models of database access behavior for the second set of clusters, wherein at least one model of the second set of models is based on two or more of the first set of models and further based on the second set of data, and wherein:
    for a cluster of the second set of clusters:
    identifying source clusters from the first set of clusters that contain database activity objects that are also contained in the cluster; and
    computing a model for the cluster, based on respective models for the source clusters and on data from the second set of data that is contained in the cluster by:
        computing a weighted average of the models for the source clusters, proportionally based on the database activity objects respectively contained in the source clusters that are also contained in the cluster; and
        incrementally training the model for the cluster, using data from the second set of data that is contained in the cluster, wherein the incrementally training the model for the cluster weights the second set of data using exponential smoothing.

2. The method in accordance with claim 1, wherein generating, by the computer, clusters in one or both of the first and second set of clusters comprises one of:
    distance-based clustering, probabilistic density-based clustering, or grid-based clustering.

3. The method in accordance with claim 1, wherein
    creating, by the computer, a respective first set of models for the first set of clusters comprises training classification machine learning models based on the first set of data and the first set of clusters.

4. The method in accordance with claim 3, wherein the classification machine learning models are respectively one or more of:
    nave Bayes, logistic regression, and support vector machine (SVM).

5. The method in accordance with claim 1, wherein the second monitoring period is a predefined time interval and the second set of data comprises data received during the predefined time interval after receiving the first set of data.

6. The method in accordance with claim 1, wherein the second set of data comprises a predefined volume of data received after receiving the first set of data.

7. The method in accordance with claim 1, wherein the generating, by the computer, a second set of clusters based on the second set of data, and based on a subset of the first set of data, comprises one of:
   merging some or all of the first set of data with the second set of data into a merged dataset, and generating clusters for the merged dataset; or
   incremental clustering, based on the first set of clusters and the second set of data.

8. A computer system for incremental training of models with dynamic clustering, the computer system comprising:
   one or more computer processors, one or more non-transitory computer-readable storage media, and program instructions stored on one or more of the computer-readable storage media for execution by at least one of the one or more processors, the program instructions comprising:
   program instructions to monitor a plurality of online database activity associated with a plurality of users for a monitoring period for two or more monitoring periods, the database activity including types and frequencies of database queries issued by the users during a monitoring period;
   program instructions to receive a first set of data corresponding with database activity during a first monitoring period;
   program instructions to generate a first set of clusters based on the first set of data, each user during the first monitoring period being associated with one of the first set of clusters;
   program instructions to create a respective first set of models of database access behavior for the first set of clusters;
   program instructions to receive a second set of data, the second set of data corresponding with database activity during a second monitoring period;
   program instructions to generate a second set of clusters based on the second set of data and based on a subset of the first set of data, wherein each user during the second monitoring period is associated with one of the second set of clusters; and
   program instructions to create a respective second set of models of database access behavior for the second set of clusters, wherein at least one model of the second set of models is based on two or more of the first set of models and further based on the second set of data, and wherein the program instructions to create a respective second set of models include:
   program instructions, for a cluster of the second set of clusters, to:
      identify source clusters from the first set of clusters that contain database activity objects that are also contained in the cluster; and
      compute a model for the cluster, based on respective models for the source clusters and on data from the second set of data that is contained in the cluster by:
         computing a weighted average of the models for the source clusters, proportionally based on the database activity objects respectively contained in the source clusters that are also contained in the cluster; and
         incrementally training the model for the cluster, using data from the second set of data that is contained in the cluster, wherein the incrementally training the model for the cluster weights the second set of data using exponential smoothing.

9. The computer system in accordance with claim 8, wherein program instructions to generate the clusters in one or both of the first and second set of clusters comprise program instructions to perform one of:
   distance-based clustering, probabilistic density-based clustering, or grid-based clustering.

10. The computer system in accordance with claim 8, wherein
   program instructions to create a respective first set of models for the first set of clusters comprise program instructions to train classification machine learning models based on the first set of data and the first set of clusters.

11. The computer system in accordance with claim 10, wherein the classification machine learning models are respectively one or more of:
   naïve Bayes, logistic regression, and support vector machine (SVM).

12. The computer system in accordance with claim 8, wherein the second monitoring period is a predefined time interval and second set of data comprises data received during the predefined time interval after receiving the first set of data.

13. The computer system in accordance with claim 8, wherein the second set of data comprises a predefined volume of data received after receiving the first set of data.

14. The computer system in accordance with claim 8, wherein the program instructions to generate a second set of clusters based on the second set of data, and based on a subset of the first set of data, comprise one of:
   program instructions to merge some or all of the first set of data with the second set of data into a merged dataset, and to generate clusters for the merged dataset; or
   program instructions to perform incremental clustering, based on the first set of clusters and the second set of data.

15. A computer program product for incremental training of models with dynamic clustering, the computer program product comprising:
   one or more non-transitory computer-readable storage media and program instructions stored on the one or more computer-readable storage media, the program instructions comprising:
   program instructions to monitor a plurality of online database activity associated with a plurality of users for two or more monitoring periods, the database activity including types and frequencies of database queries issued by the users during a monitoring period;
   program instructions to receive a first set of data corresponding with database activity during a first monitoring period;
   program instructions to generate a first set of clusters based on the first set of data, each user during the first monitoring period being associated with one of the first set of clusters;
   program instructions to create a respective first set of models of database access behavior for the first set of clusters;
   program instructions to receive a second set of data, the second set of data corresponding with database activity during a second monitoring period;

program instructions to generate a second set of clusters based on the second set of data and based on a subset of the first set of data; and program instructions to create a respective second set of models of database access behavior for the second set of clusters, wherein at least one model of the second set of models is based on two or more of the first set of models and further based on the second set of data, and wherein the program instructions to create a respective second set of models include:

program instructions, for a cluster of the second set of clusters, to:

identify source clusters from the first set of clusters that contain database activity objects that are also contained in the cluster; and   compute a model for the cluster, based on respective models for the source clusters and on data from the second set of data that is contained in the cluster by:

computing a weighted average of the models for the source clusters, proportionally based on the database activity objects respectively contained in the source clusters that are also contained in the cluster; and     incrementally training the model for the cluster, using data from the second set of data that is contained in the cluster, wherein the incrementally training the model for the cluster weights the second set of data using exponential smoothing.

\* \* \* \* \*